United States Patent Office 3,144,418
Patented Aug. 11, 1964

3,144,418
POLYMERIZATION OF EPOXIDES
Fred N. Hill, South Charleston, and John T. Fitzpatrick, Charleston, W. Va., assignors to Union Carbide Corporation, a corporation of New York
No Drawing. Filed Aug. 17, 1959, Ser. No. 833,979
12 Claims. (Cl. 260—2)

This invention relates to a process for polymerizing epoxide compounds.

In a broad aspect the instant invention is directed to the process for polymerizing vicinal-epoxy hydrocarbon free of unsaturation other than aromatic unsaturation in contact with a catalytically significant quantity of certain metal-containing compounds described hereinafter to produce useful polymers.

It is deemed appropriate at this time to define the term "reduced viscosity" since this term will be frequently employed in the specification. By the term "reduced viscosity," as used herein including the appended claims, is meant a value obtained by dividing the specific viscosity by the concentration of the polymer in the solution, the concentration being measured in grams of polymer per 100 milliliters of solvent at a given temperature. The reduced viscosity value is regarded as a measure of molecular weight. The specific viscosity is obtained by dividing the difference between the viscosity of the solution and the viscosity of the solvent by the viscosity of the solvent. Unless otherwise indicated, the reduced viscosity value is determined at a concentration of 0.2 gram of polymer per 100 milliliters of solvent, i.e., acetonitrile at 30° C.

Accordingly, one or more of the following objects will be achieved by the practice of this invention.

It is an object of this invention to provide a novel process for polymerizing vicinal-epoxy hydrocarbon free of unsaturation other than aromatic unsaturation in contact with a catalytically significant quantity of certain metal-containing compounds to produce useful polymers. It is also an object of this invention to provide a novel process for polymerizing an admixture containing two or more different vicinal-epoxy hydrocarbons which are free of unsaturation other than aromatic unsaturation in contact with a catalytically significant quantity of certain metal-containing compounds as catalysts therefor. Another object of this invention is to prepare solid polymers in accordance with the teachings herein set forth. A further object of this invention is directed to the preparation of resinous poly-(ethylene oxide). Other objects will become apparent to those skilled in the art in the light of the instant specification.

The vicinal-epoxy hydrocarbons free of unsaturation other than benzenoid unsaturation, i.e., vicinal-epoxy hydrocarbons which have a single vicinal epoxy group and which are free from unsaturation other than benzenoid unsaturation, which can be employed in the polymerization process of the invention can be characterized by the following formula:

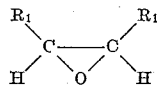

wherein each $R_1$, individually, can be hydrogen or a hydrocarbon radical free from ethylenic and acetylenic unsaturation such as, for example, alkyl, aryl, cycloalkyl, aralkyl, or alkaryl radicals. In addition, both $R_1$ variables can represent a divalent saturated aliphatic hydrocarbon radical which together with the epoxy carbon atoms, i.e., the carbon atoms of the epoxy group

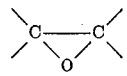

form a saturated cycloaliphatic hydrocarbon nucleus containing from 4 to 10 carbon atoms, preferably from 4 to 8 carbon atoms, such as, for example, a nucleus derived from cycloalkane, alkyl-substituted cycloalkane, cyclobutane, cyclopentane, cyclohexane, cycloheptane, cyclooctane, 2-methylcyclopentane, 3-amylcyclohexane, and the like. Illustrative $R_1$ radicals include, among others, methyl, ethyl, propyl, butyl, isobutyl, hexyl, isohexyl, 3-propylheptyl, dodecyl, octadecyl, phenyl, benzyl, tolyl, ethylphenyl, butylphenyl, phenethyl, phenylpropyl, cyclopentyl, cyclohexyl, 2-methylcyclohexyl, cycloheptyl, and the like.

Illustrative vicinal-epoxy hydrocarbons which can be employed in the polymerization process of this invention include, for example, ethylene oxide, propylene oxide, 1,2-epoxybutane, 2,3-epoxybutane, the epoxypentanes, the epoxyhexanes, the epoxyheptanes, 2,3-epoxyheptane, 5-butyl-3,4-epoxybutane, 1,2-epoxydodecane, 1,2-epoxyoctadecane, styrene oxide, ortho-, meta-, and para-ethylstyrene oxide, the oxabicycloalkanes, e.g., 7-oxabicyclo[4.1.0]heptane, 6-oxabicyclo[3.1.0]hexane, 4-propyl-7-oxabicyclo[4.1.0]heptane, and the like. The lower olefin oxides, that is, ethylene oxide, propylene oxide, and the epoxybutanes are especially suited to prepare high molecular weight products. A single vicinal-epoxy hydrocarbon or an admixture of at least two different vicinal-epoxy hydrocarbons can be employed as the monomeric feed. In polymerizing an admixture comprising two different vicinal-epoxy hydrocarbons, it is preferred that one of them be a lower olefin oxide.

The catalysts which can be employed in the polymerization reaction are zinc oxalate hydrate, cadmium oxalate, zinc phthalate, cadmium phthalate, zinc maleate, cadmium maleate, and cerium oxalate. The preferred catalysts include zinc oxalate hydrate and zinc maleate.

The catalysts are employed in catalytically significant quantities, and, in general, a catalyst concentration in the range of from about 0.01, and lower, to about 5.0 weight percent, and higher, based on the total weight of monomeric material, is suitable. A catalyst concentration of from about 0.02 to about 2.0 weight percent is preferred. For optimum results, the particular catalyst employed, the nature of the monomeric reagent(s), the operative temperature at which the polymerization reaction is conducted, and other factors will largely determine the desired catalyst concentration.

The polymerization reaction can be effected over a wide temperature range. In general, a reaction temperature in the range of from about 50° C., and lower, to about 170° C. is suitable. A reaction temperature in the range of from about 80° to about 150° C. is preferred. As a practical matter, the choice of the particular temperature at which to effect the polymerization reaction depends, to an extent, on the nature of the vicinal-epoxy hydrocarbon reagent(s) and particular catalyst employed, the concentration of the catalyst, and the like.

In general, the reaction time will vary depending on the operative temperature, the nature of the vicinal-epoxy hydrocarbon reagent(s) employed, the particular catalyst and the concentration employed, the choice and amount of an inert, normally-liquid organic vehicle, and other factors. The reaction time can be as short as a few hours in duration or it can be as long as several days.

When polymerizing an admixture containing two different vicinal-epoxy hydrocarbons, the proportions of said vicinal-epoxy hydrocarbons can vary over the entire range. Preferably the concentration is in the range of from about 5 to about 95 weight percent, based on the total weight of said vicinal-epoxy hydrocarbons.

The polymerization reaction preferably takes place in the liquid phase. Preferably, the polymerization reaction is conducted under an inert atmosphere, e.g., nitrogen. It is also desirable to effect the polymerization process under substantially anhydrous conditions.

The polymerization reaction can be carried out in the presence of an inert normally-liquid organic vehicle such as, for example, aromatic compound, e.g., benzene, toluene, xylene, ethylbenzene, chlorobenzene, and the like; various oxygenated organic compounds such as anisole, the dimethyl and diethyl ethers of ethylene glycol, of propylene glycol, of diethylene glycol and like; normally liquid saturated hydrocarbons including the open chain, cyclic, and alkyl substituted cyclic saturated hydrocarbons such as pentane, hexane, heptane, various normally-liquid petroleum hydrocarbon fractions, cyclohexane, the alkylcyclohexanes, decahydronaphthalene, and the like.

An induction period may be observed in that the polymerization is not initiated immediately. The induction period can be as short as minutes in length with the more active catalysts or it can be several hours in duration. This induction period depends, for example, on the individual catalyst employed, its preparation, the nature of the monomeric feed, the reaction temperature, the purity of the monomeric feed, and other factors.

Unreacted monomeric reagent can be recovered from the reaction product by conventional techniques such as distillation. If desired, the polymer product can be washed with an inert, normally-liquid oganic vehicle, e.g., pentane, heptane, etc., in which the polymer product is insoluble and the monomeric reagent is soluble. The washed polymer product can then be recovered, dried in a vacuum, e.g., about 10 to 50 mm. of Hg, at elevated temperatures, e.g., about 30° to 45° C. Another route involves dissolution in a first inert, normally-liquid organic vehicle, followed by addition of a second inert, normally-liquid organic vehicle which is miscible with the first organic vehicle but which is non-solvent for the polymer, thus resulting in precipitating the polymer product. The precipitated polymer is readily recovered by filtration, decantation, etc., followed by drying same under reduced pressure at slightly elevated temperatures.

The products of the polymerization process are valuable and useful polyethers. The viscous liquid to wax-like polymers can be employed as solvents, raw materials and plasticizing agents for resins, and the like. The solid polymers are useful for the production of various shaped articles, e.g., buttons, brush handles, etc. The polymers are also useful as lubricants, vehicles, and intermediates in industries such as the food, pharmaceutical, textile, and petroleum industries. Resinous ethylene oxide polymers are useful as sizing agents, coagulants, and water-soluble lubricants. The water-soluble and water-insoluble solid polymers are also useful in the preparation of films by conventional techniques such as by milling on a two-roll mill, calendering, solvent casting, and the like.

In illustrative examples below, the procedure generally employed, unless noted otherwise, to prepare the polymer was as follows. A 9-inch Pyrex tube 20 mm. in diameter was sealed at one end; the other end of the tube was fitted with a 3-inch piece of 8 mm. Pyrex tubing. The tube was cleaned, dried and flushed with dry nitrogen; a weighed quantity of catalyst was then introduced into the tube. The monomeric mixture was charged to the tube in a "dry box" containing a nitrogen atmosphere. The tube was then closed with a rubber cap, followed by cooling in Dry Ice-acetone bath; the tube was sealed under the vacuum thus obtained. The sealed tube was subsequently placed in a constant-temperature bath, said tube being agitated by rocking at the desired operating temperature for a given period of time. After this, the tube was broken open and the reaction product was freed of unreacted monomer, if any, by drying same under reduced pressure at slightly elevated temperature.

*Example 1*

To a Pyrex glass tube, there were charged 30 grams of ethylene oxide and 1.0 gram of zinc oxalate hydrate. The tube was sealed and then placed in a constant temperature bath for a period of 48 hours at 100° C. At the end of this period of time the tube was broken open. There were obtained 30 grams of a water-soluble polymer which had a reduced viscosity value of 0.27 in acetonitrile.

*Example 2*

To a Pyrex glass tube containing zinc oxalate hydrate there was charged ethylene oxide in an amount so as to give an admixture containing 0.06 weight percent zinc oxalate hydrate. The tube was sealed and placed in a constant temperature bath for a period of 21 hours at 100° C. At the end of this period of time the tube was broken open and the reaction product was freed of unreacted monomer by drying same under reduced pressure at slightly elevated temperature. There was obtained a hard, tough, water-soluble polymer which had a reduced viscosity value of 1.1 in acetonitrile. The yield was 50 percent.

In the analogous manner, propylene oxide can be homopolymerized in the presence of 0.5 weight percent cadmium maleate, under the operative conditions noted above, to give a solid, water-insoluble polymer.

*Example 3*

To a Pyrex glass tube containing zinc oxalate hydrate there was charged ethylene oxide in an amount so as to give an admixture containing 0.03 weight percent zinc oxalate hydrate. The tube was sealed and placed in a constant temperature bath for a period of 72 hours at 100° C. At the end of this period of time the tube was broken open and the reaction product was freed of unreacted monomer by drying same under reduced pressure at slightly elevated temperature. There was obtained a hard, tough, water-soluble polymer. The yield was 50 percent.

In an analogous manner, 1,2-butylene oxide can be homopolymerized in the presence of 1.0 weight percent zinc oxalate hydrate, under the operative conditions noted above, to give a water-insoluble polymer.

*Example 4*

To a Pyrex glass tube containing zinc phthalate there was charged ethylene oxide in an amount so as to give an admixture containing 0.06 weight percent zinc phthalate. The tube was sealed and placed in a constant temperature bath for a period of 36 hours at 100° C. At the end of this period of time the tube was broken open and the reaction product was freed of unreacted monomer by drying same under reduced pressure at slightly elevated temperature. There was obtained a hard, firm, water-soluble polymer. The yield was 20 percent.

*Example 5*

To a Pyrex glass tube containing cadmium oxalate there was charged ethylene oxide in an amount so as to give an admixture containing 0.3 weight percent cadmium oxalate. The tube was sealed and placed in a constant temperature bath for a period of 88 hours at 100° C. At the end of this period of time the tube was broken open and the reaction product was freed of unreacted monomer by drying same under reduced pressure at slightly elevated temperature. There was obtained a hard, tough water-soluble polymer. The yield was 10 percent.

*Example 6*

To a Pyrex glass tube containing zinc maleate there was charged ethylene oxide in an amount so as to give an admixture containing 0.3 weight percent zinc maleate. The tube was sealed and placed in a constant temperature bath for a period of 90 hours at 100° C. At the end of this period of time the tube was broken open. There was obtained a hard, tough, water-soluble polymer which had a reduced viscosity value of 3.6 in acetonitrile. The yield was quantitative.

In an analogous manner, an admixture containing 80 parts by weight of ethylene oxide and 20 parts by weight of propylene oxide can be copolymerized in the presence of 2 parts by weight of cadmium phthalate, under the operative conditions noted above, to give a solid, water-soluble copolymer.

*Example 7*

To a Pyrex glass tube containing cerium oxalate there was charged ethylene oxide in an amount so as to give an admixture containing 0.3 weight percent cerium oxalate. The tube was sealed and placed in a constant temperature bath for a period of 70 hours at 100° C. At the end of this period of time the tube was broken open and the reaction product was freed of unreacted monomer by drying same under reduced pressure at slightly elevated temperature. There was a hard, tough, water-soluble polymer which had a reduced viscosity value of 1.7 in acetonitrile.

In an analogous manner, an admixture containing 85 parts by weight of ethylene oxide and 15 parts by weight of cyclohexene oxide can be copolymerized in the presence of 3 parts by weight of zinc oxalate hydrate, under the operative conditions noted above, to give a solid, water-soluble copolymer.

*Example 8*

To a Pyrex glass tube there is charged 30 grams of 1,2-epoxybutane and 0.9 gram of zinc oxalate hydrate. The tube is sealed and then placed in a constant temperature bath for a period of 64 hours at 90° C. At the end of this period of time the tube is broken open and the reaction product is freed of unreacted monomer by drying same under reduced pressure at slightly elevated temperature. There is obtained a water-insoluble polymer.

Although the invention has been illustrated by the preceding examples, the invention is not to be construed as limited to the materials employed in the abovesaid exemplary examples, but rather, the invention encompasses the generic area as hereinbefore disclosed. Various modifications and embodiments of this invention can be made without departing from the spirit and scope thereof.

What is claimed is:

1. A process for polymerizing a saturated vicinal epoxy hydrocarbon having a single vicinal epoxy group and containing from 2 to 4 carbon atoms which comprises contacting said vicinal epoxy hydrocarbon with a catalytically significant quantity of a catalyst selected from the group consisting of zinc oxalate hydrate, cadmium phthalate, zinc maleate, cadmium maleate and cerium oxalate, at an elevated temperature for a period of time sufficient to produce a solid polymer.

2. A process for polymerizing a saturated vicinal epoxy hydrocarbon having a single vicinal epoxy group and containing from 2 to 4 carbon atoms which comprises contacting said vicinal epoxy hydrocarbon with from about 0.01 to about 5.0 weight percent based upon the weight of the vicinal epoxy hydrocarbon, of a catalyst selected from the group consisting of zinc oxalate hydrate, cadmium phthalate, zinc maleate, cadmium maleate and cerium oxalate, at a temperature of from about 50° C. to about 170° C. for a sufficient period of time to produce a solid polymer.

3. The process of claim 1 wherein the said catalyst is zinc oxalate hydrate.

4. The process of claim 1 wherein the said catalyst is cadmium phthalate.

5. The process of claim 1 wherein the said catalyst is zinc maleate.

6. The process of claim 1 wherein the said catalyst is cadmium maleate.

7. The process of claim 1 wherein the said catalyst is cerium oxalate.

8. A process for the polymerization of an admixture containing at least two saturated vicinal epoxy hydrocarbons having a single vicinal epoxy group and containing from 2 to 4 carbon atoms which comprises contacting said vicinal epoxy hydrocarbons with from about 0.01 to about 5.0 percent by weight based on the weight of said vicinal epoxy hydrocarbon of a catalyst selected from the group consisting of zinc oxalate hydrate, cadmium phthalate, zinc maleate, cadmium maleate, and cerium oxalate at a temperature of from about 50° C. to 170° C. for a sufficient period of time to produce a solid copolymer.

9. The process of claim 8 wherein said vicinal epoxy hydrocarbons are ethylene oxide and propylene oxide.

10. A process for polymerizing ethylene oxide which comprises contacting said ethylene oxide with from about 0.01 to about 5.0 percent by weight based on the ethylene oxide of a catalyst selected from the group consisting of zinc oxalate hydrate, cadmium phthalate, zinc maleate, cadmium maleate and cerium oxalate at a temperature in the range of from about 80° C. to about 150° C. for a period of time sufficient to produce solid poly(ethylene oxide).

11. The process of claim 10 wherein said catalyst is zinc oxalate hydrate.

12. The process of claim 10 wherein the said catalyst is zinc maleate.

References Cited in the file of this patent

UNITED STATES PATENTS

| | | |
|---|---|---|
| 2,706,182 | Pruitt et al. | Apr. 12, 1955 |
| 2,803,609 | Schlenker | Aug. 20, 1957 |
| 2,911,377 | Gurgiolo et al. | Nov. 3, 1959 |
| 2,917,470 | Bressler et al. | Dec. 15, 1959 |
| 2,934,505 | Gurgiolo | Apr. 26, 1960 |